US005612796A

United States Patent [19]
DeCook et al.

[11] Patent Number: 5,612,796
[45] Date of Patent: Mar. 18, 1997

[54] PHOTOGRAPHIC FILM PREPARATION WORKSTATION

[75] Inventors: Bradley C. DeCook, Rochester; Thomas J. Murray, LeRoy, both of N.Y.

[73] Assignee: Eastman Kodak Company, Rochester, N.Y.

[21] Appl. No.: 394,533

[22] Filed: Feb. 17, 1995

[51] Int. Cl.[6] .................................................... H04N 1/27
[52] U.S. Cl. .............................. 358/527; 358/302; 355/36
[58] Field of Search ................................... 358/527, 487, 358/335, 345, 346, 302; 354/412; 355/36, 38–42; 348/97; H04N 1/27

[56] References Cited

U.S. PATENT DOCUMENTS 5,101,225  3/1992  Wash et al. .

Primary Examiner—Kim Vu
Attorney, Agent, or Firm—C. J. Fildes & Co., P.C.

[57] ABSTRACT

A photographic film preparation workstation for supplying a high speed photographic printer and an index printer with film image computational data and film encoded data includes a film motion controller subsystem for controlling film movement, a film code reader subsystem for reading optically encoded film data, a magnetics reader subsystem for reading magnetically encoded film data, a film scanner subsystem for scanning film image data and generating a scanned image signal, a magnetics writer subsystem for optionally writing magnetic data to new format films, and a workstation controller in communication with the workstation subsystems for organizing, storing, and distributing subsystem signals.

8 Claims, 3 Drawing Sheets

PHOTOGRAPHIC FILM PREPARATION WORKSTATION

FIELD OF THE INVENTION

This invention relates to photofinishing and more particularly to a workstation for supplying a high speed photofinishing system with film image computational data and film encoded data obtained from photographic film formats including magnetically encoded information and optically encoded information as well as imaging information.

BACKGROUND OF THE INVENTION

It is known in the art of commercial photographic processing to maintain very high rates of processing in order to operate profitably. Recent developments in photographic systems include the combination of silver halide and magnetics technologies. New film formats have a magnetic strip containing magnetic information that must be processed on compatible equipment. These new films also include additional optical information such as bar coded film ID number and frame numbers, and print aspect ratio and cartridge hand of load, known as "fat" bits. New and conventional photographic processing equipment must be able to read and interpret this information so that photographic as well as index prints can be generated.

Commercial photographic processing systems are unable to process film formats including encoded magnetic data, encoded optical data, and imaging data at any rate of speed.

SUMMARY OF THE INVENTION

The present invention provides a workstation in combination with a high speed printer that supplies optical and magnetic data available on new film formats to compatible optical/magnetic printers. The present invention also provides data to prepare raster images and sends them to an external index printer for the production of index prints. In addition, the present invention allows a conventional high speed photo processing system to utilize the image, optical, and magnetic data found on the new film formats. The informational data provided by the workstation allows index prints to be generated from conventional 35 mm films as well as the new film formats.

These and other features and advantages of the invention will be more fully understood from the following detailed description of the invention taken together with the accompanying drawings.

DETAILED DESCRIPTION OF THE INVENTION

Figure 1:
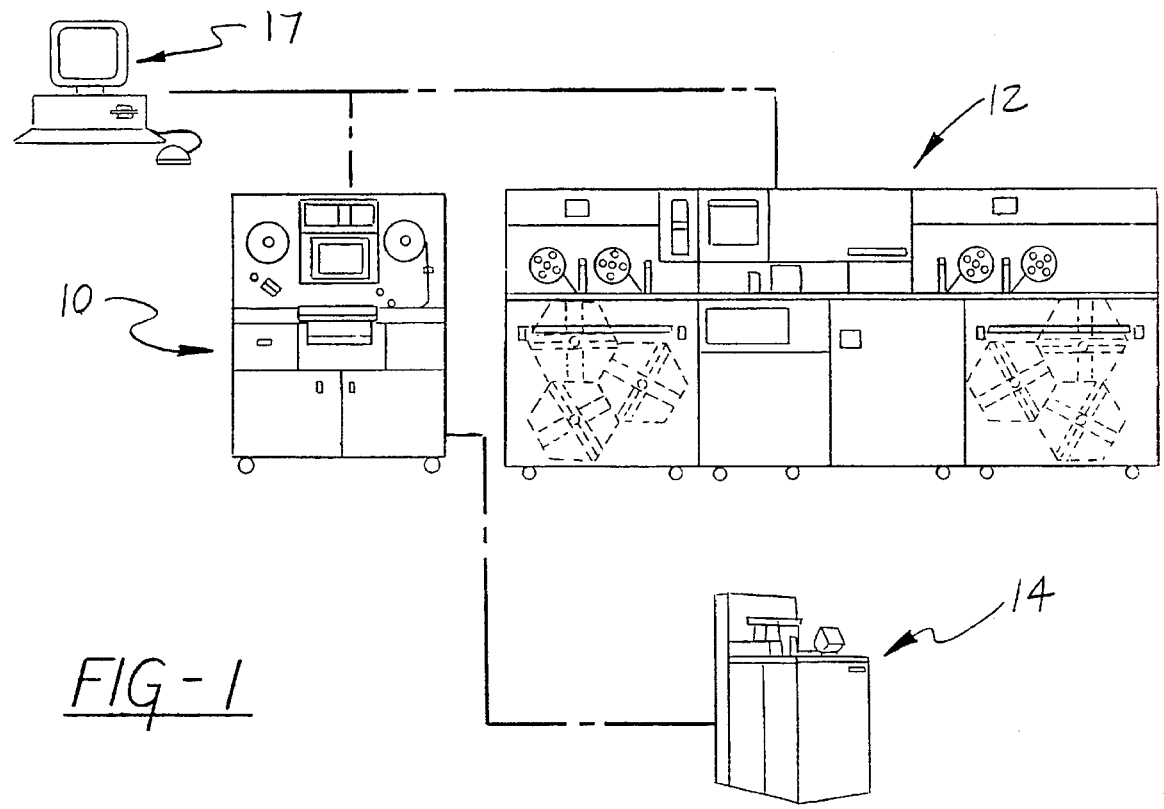
FIG. 1 is a schematic plan view of a film processing workstation constructed in accordance with the present invention and illustrated in communication with a high speed printer and an index printer.

Referring now to the drawings in detail, numeral 10 generally indicates a photographic film preparation workstation for supplying magnetically encoded film data, optically encoded film data and film image scanner computational data to a high speed photographic printer 12 and an index printer 14 as illustrated in FIG. 1. The workstation 10 also provides color corrected and formatted RGB data to the index printer 14. It will become apparent that this data obtained from film 16 can be supplied to service print printers, optical/magnetic index printers, photo CD writers, and additional down stream devices found inside and outside a photofinishing lab.

The film processing workstation 10 is dependent upon data supplied on the new film format during film manufacture and the data encoded or captured on the film at the time the new film format is exposed. The data captured at the time of exposure includes both the computational data derived from the intrinsically captured image and the magnetic and/or optically encoded data that was written by the camera. Additionally, the film processing workstation 10 is dependent upon information that can be encoded on the new format film after exposure via the use of magnetic and optically enabled devices and/or data that is supplied by a photofinishing information system 17. Data from the photofinishing information system 17 is able to be interfaced with the film processing workstation 10 manually, via a floppy disk, or via an Ethernet connection.

Figure 2:
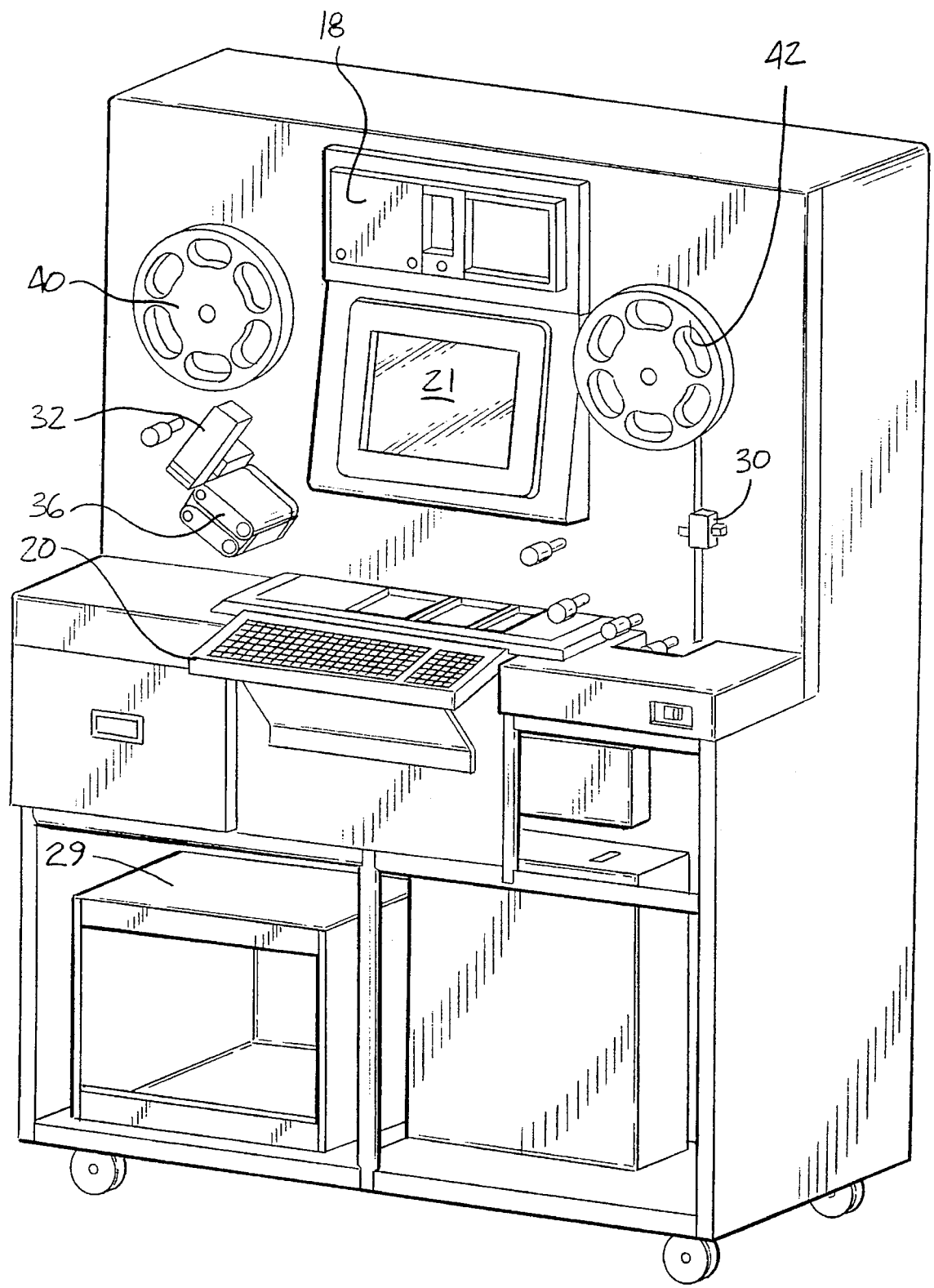
FIG. 2 is a perspective view of the film processing workstation of FIG. 1 illustrating the major subsystems of the stations.
Figure 3:
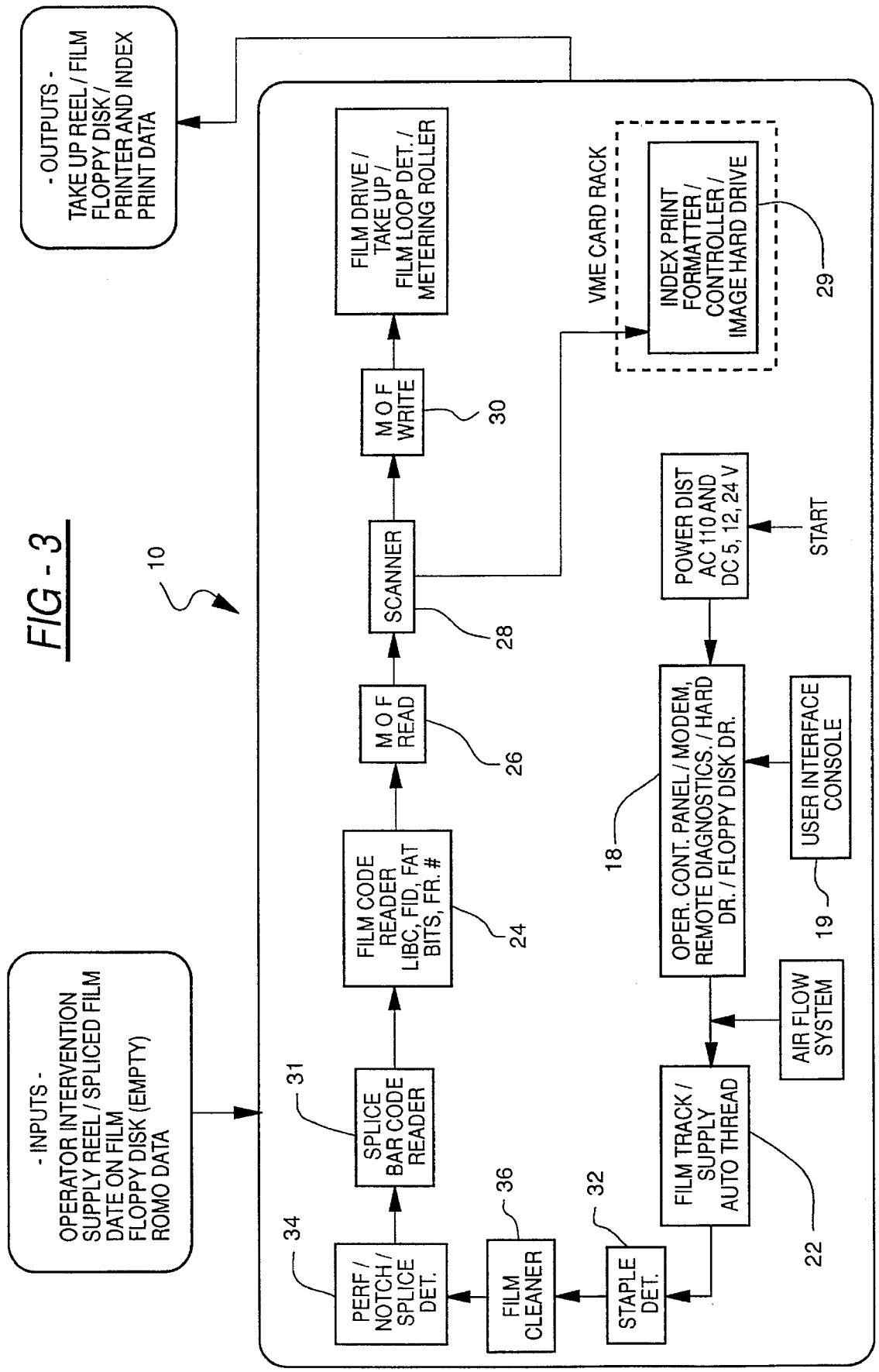
FIG. 3 is a schematic flow diagram of the film processing workstation illustrating the subsystems of the station.

FIGS. 2 and 3 illustrate the major components of the film processing workstation 10 which includes a workstation controller 18 in communication with herein described workstation subsystems. The workstation controller 18 organizes, stores, and distributes subsystem signals. A console subsystem 19 provides a communications interface between an operator and the workstation subsystems. Console subsystem 19 includes user interface devices such as a keyboard 20 and CRT display 21. Workstation controller 18 acts as the communications hub for all the workstation subsystems. Workstation controller 18 is also the interface point for all diagnostics services to the workstation subsystems and acts as the synchronization source for machine operation.

The film preparation workstation 10 also includes a film motion controller subsystem 22 for controlling film movement, a film code reader subsystem 24 for reading optically encoded film data, a magnetics reader subsystem 26 for reading magnetically encoded film data, a film scanner subsystem 28 for scanning film image data and generating a scanned image signal and a magnetics writer subsystem 30 for magnetically writing data on the new film, such as exposure data. These systems 22, 24, 26, 28, 30 as well as other herein described subsystems are in communication with the workstation controller 18.

The film motion controller subsystem 22 receives commands from the workstation controller 18 to move the film 16, set the direction of film movement, and the speed of the film motion. The film motion controller subsystem 22 responds to commands from the workstation controller 18 with appropriate film motion, and film motion status and maintains control of the film motion to comply with the motion requirements for the subsystems that must detect and write the encoded and image data on the film.

The film code reader subsystem 24 decodes both the optically encoded data transferred to the new format film at the time of manufacture and that transferred to the film, or encoded, at the time of image exposure by a camera. The decoded optical data is transferred to the workstation controller 18 for storage and distribution to the other internal subsystems and to any external equipment interfaced to the workstation 10.

The magnetics reader subsystem 26 reads and decodes the magnetic data from the new format film. The decoded magnetic data read by the magnetics reader subsystem 26 is transferred to the workstation controller 18 for storage and distribution to both the internal subsystems of the workstation 10 and to any externally equipment interfaced with the workstation.

The film scanner subsystem 28 scans the new format film and performs image algorithmic operations on the image data scanned. Image format and film type information and magnetics data is received by the film scanner subsystem 28 from the workstation controller 18. The image computationally derived data generated by the film scanner subsystem 28 is transferred to the workstation controller 18 for storage and transmission to both the workstation internal subsystems and any external equipment interfaced with the workstation. Scanned image data is transferred by the film scanner subsystem 28 to an index print controller 29 for generating index prints on index printer 14.

The index print controller subsystem 29 is in communication with the film scanner subsystem 28 and workstation controller 18 for receiving image data and formatting index prints.

The magnetics writer subsystem 30 is used to write magnetic data, such as exposure data, on new format film for use in subsequent processing. Non-magnetic film, such as old format 35 mm, is threaded to bypass the writer subsystem 30.

The splice bar code reader subsystem 31 reads encoded bar codes found on splices between film orders for film formats that require an additional means to track an order within a photofinishing lab. The decoded bar code data is transferred to the workstation controller 18 for storage and distribution to external equipment interfaced with the workstation.

Additional subsystems of the workstation 10 include a staple detection subsystem 32 for detecting staples in the film supplied to the workstation. Staple detection subsystem 32 operates to prohibit film 16 advancement through the workstation 10 when the presence of a staple is detected. This safety feature prevents potential damage to critical subsystems such as the magnetics reader subsystem 26 or film scanner subsystem 28 due to the presence of staples.

A perforation, notch and splice detector 34 detects film perforations in new format films and notches in existing 35 mm film format. This information is fed to film motion controller subsystem 22 to effectively control the timing of each film frame read in scanning operation.

A film cleaner subsystem 36 is provided in the workstation before the magnetics reader subsystem 26 and film scanner subsystem 28. The film cleaner subsystem 36 is required to be ahead of all reading and scanning function subsystems and removes particles of 10 micron size and larger from both sides of film. Particles of this size can adversely affect the read and scan functions.

Figure 4:
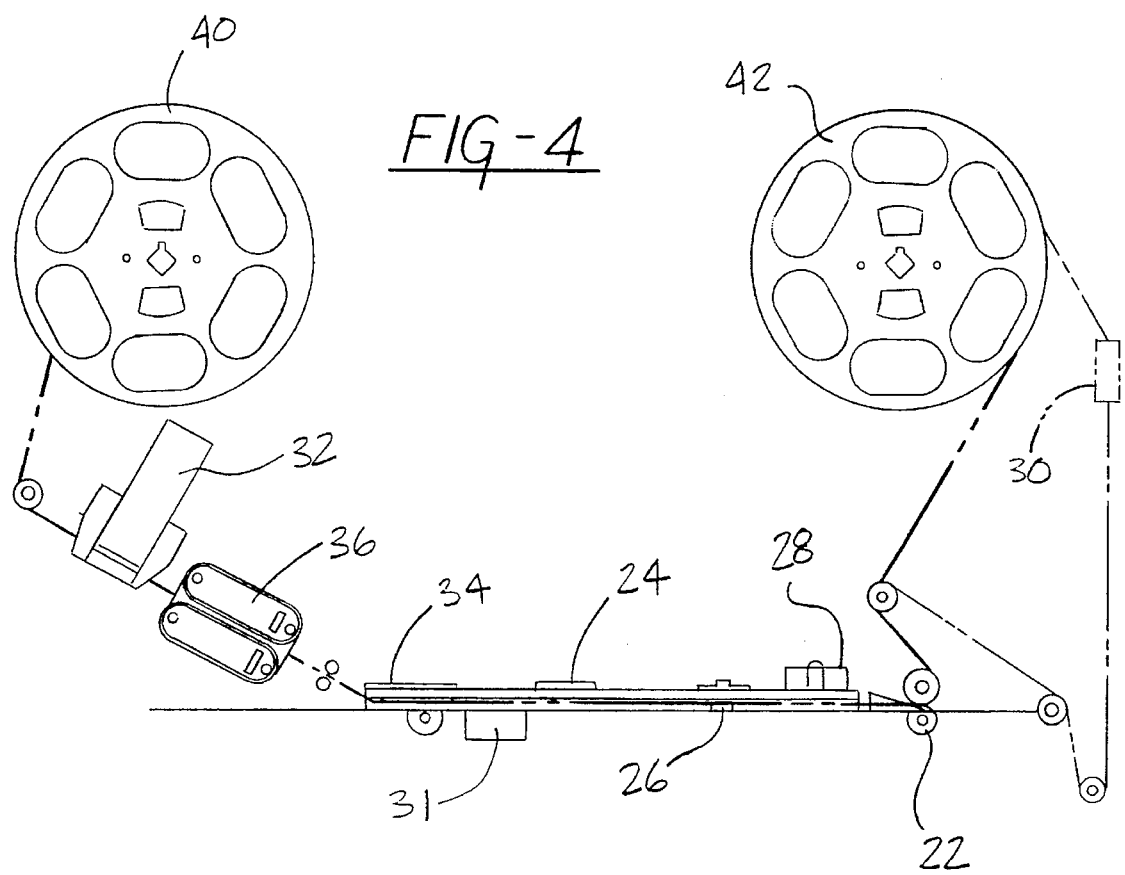
FIG. 4 is a detail schematic view of the film handling system of the film processing workstation.

FIGS. 3 and 4 illustrate the functional operation of the workstation 10. In operation, film 16 is supplied on a film supply reel 40 routed through the subsystem components as hereinabove described and taken up on a film take-up reel 42. The film 16 passes the staple detection subsystem 32, passes through the film cleaner subsystem 36, and is conducted through the perforation, notch and splice detector 34 to the splice bar code reader subsystem 31. The splice bar code reader subsystem 31 provides a read bar code number for each order under which film information can be stored.

The film is then directed through the film code reader 24 which reads optically encoded information on the film, such as film ID, frame numbers and "fat" bits, and sends decoded information to the workstation controller. Next the film is conducted to the magnetics reader subsystem 26 where manufacturer inputted information and camera exposure information is magnetically read. Information obtained from the magnetics reader subsystem 26 is fed to the film scanner subsystem 28 with print aspect ratio and camera exposure information before scanning. Next the film scanner subsystem 28 optically scans the film for exposure and imagette information. The scanned information, along with the scanner algorithm, determines the proper exposure parameters for the high speed printer 12. The film scanner subsystem 28 also produces imaging data that is utilized by the index print controller subsystem 29 for generating index prints on the index printer 16.

From the scanner 28, new format film with magnetic capability is fed through the magnetics writer subsystem 30 where exposure information, etc., is added to the magnetic stripe. The minimum distance between the film scanner subsystem 28 and magnetics writer subsystem 30 is critical. Exposure parameters must be calculated prior to writing. This calculation requires scanning of the "full order" along with calculation time. The film 16 is then taken up by take-up reel 42.

The information organized and stored in workstation controller 18 is obtainable through known communications connections or transfer means such as hard wiring, floppy disc, or tape drive.

As has been more fully described above, the film processing workstation 10, through the use of the subsystems that comprise the unit, is able to capture and add to the data set found on the new format film. Also, the film processing workstation 10 can organize the data and make it available to other dependent equipment found inside the photofinishing lab. The access medium for this organized data is also by floppy disk and Ethernet connection.

Although the invention has been described by reference to a specific embodiment, it should be understood that numerous changes may be made within the spirit and scope of the inventive concepts described. Accordingly, it is intended that the invention not be limited to the described embodiment, but that it have the full scope defined by the language of the following claims.

| Parts List | |
| --- | --- |
| 10. workstation | 28. film scanner subsystem |
| 12. photographic printer | |
| 14. index printer | 29. index print controller |
| 16. film | |
| 17. photofinishing information system | 30. magnetics writer subsystem |
| 18. workstation controller | 31. splice bar code reader subsystem |
| 19. console subsystem | |
| 20. keyboard | 32. staple detection subsystem |
| 22. film motion controller subsystem | |
| | 34. perforation, notch and splice detector |
| 24. film code reader subsystem | |
| | 36. film cleaner subsystem |
| 26. magnetics reader subsystem | |
| | 40. film supply reel |
| | 42. take-up reel |

What is claimed is:

1. A photographic film preparation workstation for supplying a high speed photographic printer and an index printer with film image computational data and film encoded data, said workstation being an integrated unit including:

a film motion controller subsystem for controlling film movement;

a film code reader subsystem for reading optically encoded film data;

a magnetics reader subsystem for reading magnetically encoded film data;

a film scanner subsystem for scanning film image data and generating a scanned image signal including digitized image data needed for generating index prints; and a workstation controller in communication with said workstation subsystems for organizing, storing and distributing subsystem signals.

2. The workstation of claim 1 characterized by:

a console subsystem providing a communications interface between an operator and said workstation subsystems.

3. The workstation of claim 2 characterized by:

an index print controller subsystem in communication with said film scanner subsystem and workstation controller for receiving image data and formatting index prints.

4. The workstation of claim 1 characterized by:

a magnetics writer subsystem for writing magnetically encoded exposure data on film for processing.

5. The workstation of claim 1 characterized by:

a splice bar code reader subsystem in communication with said workstation controller for reading encoded bar code on splices between film orders.

6. The workstation of claim 1 characterized by:

a film cleaner subsystem for removing particles of a selected size and larger from both sides of said film.

7. The workstation of claim 1 characterized by:

a staple detection subsystem for detecting staples and shutting down said workstation when the presence of a staple is detected.

8. The workstation of claim 1 characterized by:

a perforation, notch and splice detector subsystem for detecting indicators for film timing and motion.

\* \* \* \* \*

UNITED STATES PATENT AND TRADEMARK OFFICE
CERTIFICATE OF CORRECTION

PATENT NO. : 5,612,796
DATED : March 18, 1997
INVENTOR(S) : DeCook et al.

It is certified that error appears in the above-identified patent and that said Letters Patent is hereby corrected as shown below:

Title Page - Item [56] - Add:
References Cited

U.S. PATENT DOCUMENTS

| | | |
|---|---|---|
| 4,294,537 | 10/1981 | Laska et al. |
| 4,933,713 | 6/1990 | Tsuji et al. |
| 5,087,027 | 2/1992 | Acquaviva |
| 5,093,684 | 3/1992 | Crochetierre et al. |
| 5,157,437 | 10/1992 | Takenaka |
| 5,159,385 | 10/1992 | Imamura |
| 5,184,227 | 2/1993 | Foley |
| 5,281,993 | 1/1994 | Chochetierre et al. |

Signed and Sealed this

Ninth Day of June, 1998

*Attest:*

BRUCE LEHMAN

*Attesting Officer*  *Commissioner of Patents and Trademarks*